(12) United States Patent
Terada

(10) Patent No.: US 7,899,319 B2
(45) Date of Patent: Mar. 1, 2011

(54) CAMERA CAPABLE OF DISPLAYING LIVE VIEW

(75) Inventor: Hiroshi Terada, Mitaka (JP)

(73) Assignee: Olympus Imaging Corp., Tokyo (JP)

( * ) Notice: Subject to any disclaimer, the term of this patent is extended or adjusted under 35 U.S.C. 154(b) by 944 days.

(21) Appl. No.: 11/789,347

(22) Filed: Apr. 24, 2007

(65) Prior Publication Data

US 2007/0253692 A1     Nov. 1, 2007

(30) Foreign Application Priority Data

Apr. 28, 2006     (JP) ............................... 2006-126504

(51) Int. Cl.
G03B 7/099    (2006.01)
G03B 3/00     (2006.01)
G03B 19/12    (2006.01)

(52) U.S. Cl. .................. 396/272; 396/89; 396/357; 396/358

(58) Field of Classification Search .................. 396/89, 396/272, 358, 354, 357
See application file for complete search history.

(56) References Cited

U.S. PATENT DOCUMENTS

2006/0077282 A1 *   4/2006   Kido et al. .................. 348/362

FOREIGN PATENT DOCUMENTS

JP      2002-369042     12/2002

* cited by examiner

*Primary Examiner*—Rochelle-Ann J Blackman
(74) *Attorney, Agent, or Firm*—Straub & Pokotylo; John C. Pokotylo

(57) ABSTRACT

A camera capable of displaying a live view is disclosed, which has a movable reflecting mirror movable between a viewing position for reflecting a light beam from a photographing lens to guide the light beam to a finder optical system, and a position retracted from an area through which the light beam from the photographing lens passes, and which is configured such that, upon focusing the photographing lens from the state of the live view display, the movable reflecting mirror is driven without charging a shutter.

11 Claims, 12 Drawing Sheets

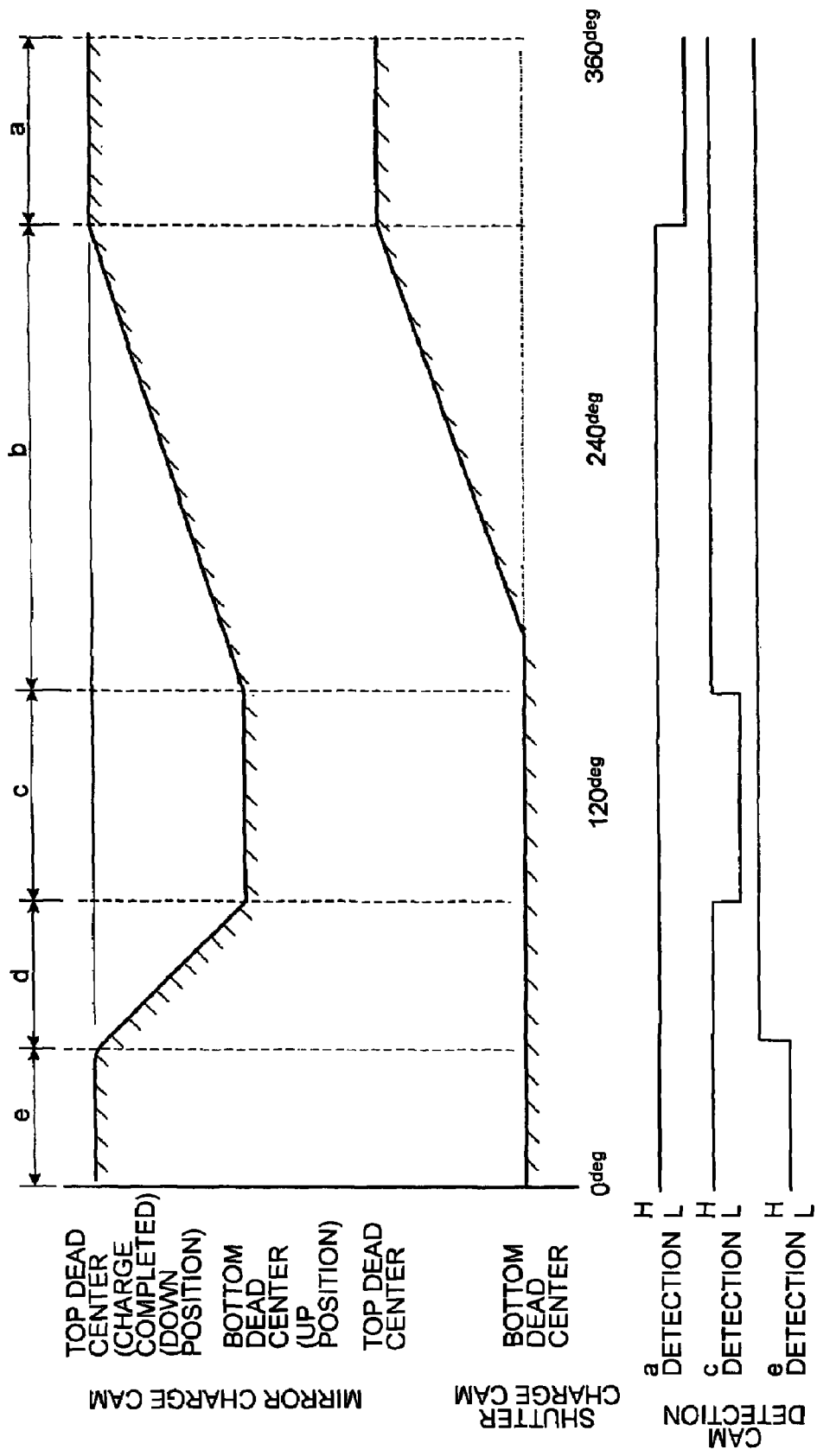

CAMERA CAPABLE OF DISPLAYING LIVE VIEW

CROSS-REFERENCE TO RELATED APPLICATION

This application is based upon and claims the benefit of priority from prior Japanese Patent Application No. 2006-126504, filed on Apr. 28, 2006, the entire contents of which are incorporated herein by reference.

BACKGROUND OF THE INVENTION

1. Field of the Invention

The present invention relates to a camera having a live view display function. The live view display function is to display a series of images repeatedly acquired by an image pickup device on a display device as a moving picture. The live view display function is also called a through-image display function or an electronic finder function.

2. Description of the Related Art

While traditional cameras were designed to view a subject image through an optical finder, a growing number of recent digital cameras have incorporated a function, so-called live view display function, for displaying live images acquired by an image pickup device continuously on a display device such as an LCD monitor or the like. These digital cameras having the live view display function may have an optical finder or not.

Such a live view display function causes no parallax, for example, and it is effective for macro shooting and the like. For this and other reasons, various examples of including the live view display function in the single-lens reflex digital camera have been proposed.

For example, there is proposed a digital single-lens reflex camera capable of displaying a live view, in which an optical finder display mode and an electronic finder display mode are selectable (Japanese Patent Application Laid-Open No. 2002-369042). In this digital single-lens reflex camera, when the electronic finder display mode is selected, a movable mirror is retracted from the shooting optical path and a focal-plane shutter is fully opened to guide light of a subject image to an image pickup device in order to display a series of acquired subject images continuously on an LCD monitor.

In the meantime, upon activation of this type of live view display function, the movable mirror has to be retracted from the shooting optical path. On the other hand, the movable reflecting mirror needs to be moved into the shooting optical path to perform automatic focusing control (AF) using a TTL phase-difference method generally applied to the conventional single-lens reflex camera. For this reason, the live view display is stopped before the conventional single-lens reflex camera performs TTL phase-difference AF.

In addition, in the conventional single-lens reflex camera, the shutter charge operation and the retraction of the movable reflecting mirror are performed concurrently.

BRIEF SUMMARY OF THE INVENTION

The camera of the present invention capable of displaying a live view has a movable reflecting mirror movable between a viewing position for reflecting a light beam from a photographing lens to guide the light beam to a finder optical system, and a position retracted from an area through which the light beam from the photographing lens passes, and is configured such that, upon focusing the photographing lens from the state of a live view display, the movable reflecting mirror is driven without charging a shutter.

An exemplary structure of the camera of the present invention capable of displaying a live view can be expressed as follows: A camera capable of displaying a live view comprises: a movable reflecting mirror made movable by the rotation of a motor between a viewing position for reflecting a light beam from a photographing lens to guide the light beam to a finder optical system, and a position retracted from an area through which the light beam from the photographing lens passes; an image pickup device arranged behind the movable reflecting mirror to receive a subject light beam from the photographing lens in order to capture a subject image when the movable reflecting mirror is at the retracted position; an image display part for displaying the subject image captured by the image pickup device; a focusing sensor for focusing the photographing lens on the subject; a reflecting mirror for focusing to guide the light beam from the photographing lens to the focusing sensor in conjunction with the movable reflecting mirror when the movable reflecting mirror is at the viewing position; an automatic focus control mechanism for driving the photographing lens to an in-focus position based on the output of the focusing sensor; a shutter arranged between the movable reflecting mirror and the image pickup device; and a drive mechanism which, upon focusing the photographing lens while displaying a moving image acquired from the image pickup device on the image display part, actuates the automatic focusing control mechanism, drives the movable reflecting mirror to the retracted position, and drives the movable reflecting mirror to the viewing position without charging the shutter.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 1A shows the internal structure along the optical axis direction of a photographing lens, and FIG. 1B shows the internal structure as viewed from the front of a camera body 200;

FIG. 2A is a perspective view of the shutter, FIG. 2B is a front view of the shutter, FIG. 2C is a perspective view of the movable reflecting mirror, FIG. 2D shows a mirror-down state of the movable reflecting mirror, and FIG. 2E shows a mirror-up state of the movable reflecting mirror;

FIG. 4A shows cam areas of a mirror charge cam, and FIG. 4B shows cam areas of a shutter charge cam, respectively;

FIG. 5 is a development view of the cam areas of the single-lens reflex digital camera according to the first embodiment of the present invention;

DETAILED DESCRIPTION OF THE PREFERRED EMBODIMENT

Preferred embodiments of the invention are described below with reference to the accompanying drawings.

Figure 1A:
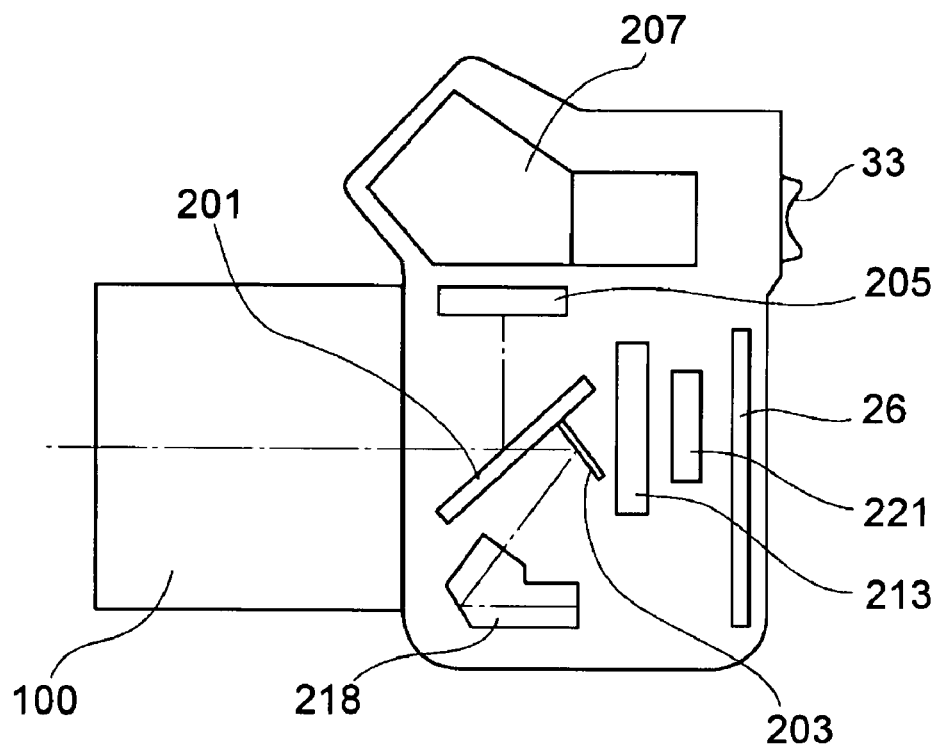
FIGS. 1A and 1B are block diagrams schematically showing an internal mechanism of a single-lens reflex digital camera according to a first embodiment of the present invention, where
Figure 1B:
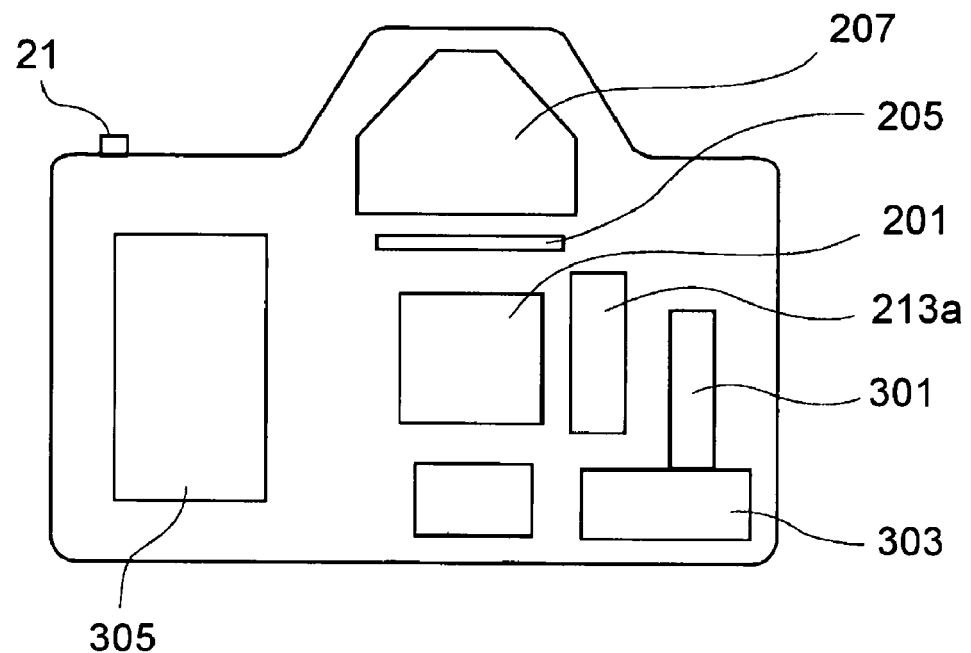

A preferred embodiment is described below using a single-lens reflex digital camera to which the present invention is applied. FIGS. 1A and 1B are block diagrams showing the schematic structure of an internal mechanism of the digital single-lens reflex camera according to the preferred embodiment. FIG. 1A is an internal structure block diagram along the optical axis direction of a photographing lens. FIG. 1B is an internal structure block diagram as viewed from the front of a camera body 200.

A release button 21 is arranged on the top face of the camera body 200. This release button 21 has a first release switch (hereinafter referred to as "1R") which is turned on at the half press of the release button 21, and a second release switch (hereinafter referred to as "2R") which is turned on at the full press of the release button 21. When this first release switch is turned on, the camera performs shooting preparation operations, such as focus detection, focusing of the photographing lens, measuring subject brightness, etc. Then, when the second release switch is turned on, the camera performs a shooting operation for capturing image data of a subject image based on the output of a CCD (Charge Coupled Device) 221 (see FIG. 6) as an image pickup device.

A movable reflecting mirror 201 is arranged inside a mirror box of the camera body 200 on the optical axis of a photographing lens 101 (see FIG. 6) arranged inside an interchangeable lens 100. This movable reflecting mirror 201 is movable between a position 4.5 degrees inclined with respect to the optical axis of the photographing lens 101 to reflect a subject light beam into a finder optical system (for example, a pentaprism 207, etc.) and a position retracted from the shooting optical path to guide the subject light beam to an image pickup device (a CCD (Charge Coupled Device) 221 to be described later). The axis of rotation of the movable reflecting mirror 201 is along a direction perpendicular to the paper surface of FIG. 1A. The subject light beam is reflected upward by this movable reflecting mirror 201. In the embodiment, the direction of reflection of the subject light beam is upward, but the present invention is not limited to the upward direction. Any direction can be selected, to the right or left of the camera body, as long as the direction of reflection of the subject light beam is the best suited to the arrangement of mechanical members and optical members of the camera.

A focusing screen 205 is arranged on the reflected optical axis of the movable reflecting mirror 201. The focusing screen 205 is a mat surface on which the subject light beam through the photographing lens 101 is focused to form a subject image. The focusing screen 205 is arranged at a position spaced from the movable reflecting mirror 201 by a distance equal to the distance between the movable reflecting mirror 201 and the CCD 221. A pentaprism 207 is arranged above the focusing screen 205 to flip the subject image horizontally left to right. A finder eyepiece part 33 is an eyepiece part of a finder optical system to allow the camera user to look therethrough to check the subject image.

The central portion of the above-mentioned movable reflecting mirror 201 is formed into a half mirror. A sub-mirror 203 for distance measurement (a reflecting mirror for focusing) is provided on the backside of this movable reflecting mirror 201 to reflect the subject light beam passing through the half mirror portion. This sub-mirror 203 is movable with respect to the movable reflecting mirror 201. In other words, when the movable reflecting mirror 201 is retracted from the shooting optical path to let the subject light beam enter the CCD 221, the sub-mirror 203 is moved to a position to cover the half mirror portion. On the other hand, when the movable reflecting mirror 201 is at the position for viewing the subject image as shown in FIG. 1A, the sub-mirror 203 is at a position where it remains popped up at an angle to the movable reflecting mirror 201. This movable reflecting mirror 201 is driven by a shutter/mirror driving unit 303. Further, a distance measurement unit 218 including a TTL phase-difference type distance measurement circuit 217 (see FIG. 6) including a distance measurement sensor is arranged on the reflected optical path of the sub-mirror 203. The distance measurement unit 218 detects a defocus amount of the subject image formed through the photographing lens 101.

A focal-plane type shutter 213 for exposure time control is arranged behind the movable reflecting mirror 201. The driving of this shutter 213 is controlled by a shutter control part 213a including a shutter drive mechanism 215 (FIG. 6) and the shutter/mirror driving unit 303. The CCD 221 as the image pickup device is arranged behind the shutter 213. The CCD 221 photoelectrically converts the subject image formed through the photographing lens 101 into an electric signal. In the embodiment, the CCD is used as the image pickup device, but the present invention is not limited to the CCD, and any other two-dimensional image pickup device such as a CMOS (Complementary Metal Oxide Semiconductor) can be used.

A battery 305 is arranged on the left when viewed from the front of the camera body 200 to supply power to the entire camera body. On the right side of the body, a mirror/shutter (hereinafter abbreviated as "MS") motor 301 as a drive source for the shutter 213 and the movable reflecting mirror 201 is arranged. The shutter/mirror driving unit 303 for transmitting the driving force of this MS motor 301 is arranged below the MS motor 301 to engage with the drive shaft of the MS motor 301. Further, the shutter control part 213a is arranged at the side of the movable reflecting mirror 201 to control the driving of the shutter 213.

Next, a driving control mechanism of the movable reflecting mirror 201 and the shutter 213 will be described with reference to FIGS. 2 to 5.

Figure 2A:
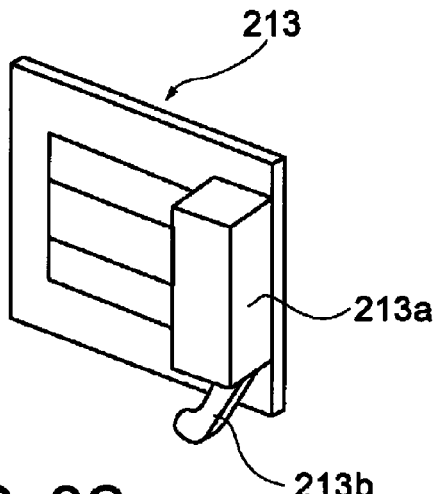
FIGS. 2A to 2E are views showing a shutter and a movable reflecting mirror of the single-lens reflex digital camera according to the first embodiment of the present invention, where
Figure 2B:
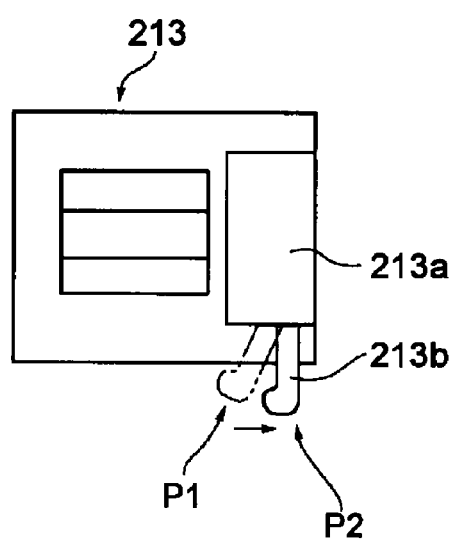
Figure 2C:
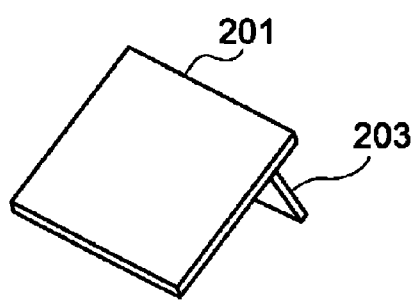
Figure 2D:
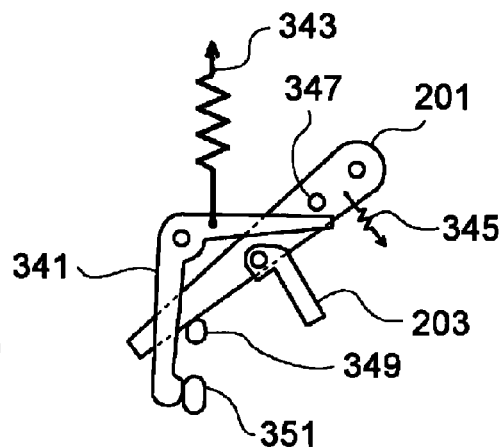
Figure 2E:
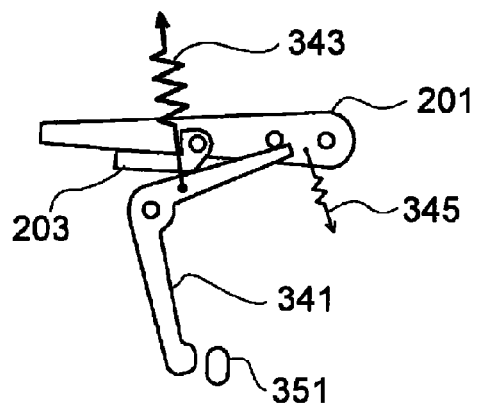

FIGS. 2A to 2E are views showing the shutter 213 and the movable reflecting mirror 201. FIG. 2A is a perspective view of the shutter 213, and FIG. 2B is a front view of the shutter 213. FIG. 2C is a perspective view of the mirrors. FIGS. 2D and 2E are views showing mirror-down and mirror-up states of the movable reflecting mirror 201, respectively.

As shown in FIG. 2A, the shutter control part 213a is arranged at the side of the shutter 213, and a shutter set lever 213b projects from the bottom of this shutter control part 213a. This shutter set lever 213b is initially located at position P1 (indicated by a chain double-dashed line) in FIG. 2B, and upon completion of shutter charge, it moves to position P2 indicated by a solid line in FIG. 2B.

As shown in FIG. 2C, when the movable reflecting mirror 201 is in the down state, the sub-mirror 203 is at the position where it is kept popping up to the movable reflecting mirror 201. As shown in FIG. 2D, a mirror-down spring 345 is provided on the side of the axis of rotation of the movable reflecting mirror 201 to urge the movable reflecting mirror 201 counterclockwise in FIG. 2D, i.e., in the down direction. The position of the movable reflecting mirror 201 urged by this mirror-down spring 345 is restricted by a position restricting pin 349 45 degrees with respect to the shooting optical path. A mirror drive lever 341 has an L-type shape and is urged by a mirror drive spring 343 counterclockwise, i.e., in the direction to flip up the mirror. One end of the mirror drive lever 341 is engaged with an engaging pin 347 fixed to the movable reflecting mirror 201. Note that the spring force of the mirror drive spring 343 is set always greater than the spring force of the mirror-down spring 345.

In the mirror down state, the mirror drive lever 341 is rotated clockwise by a mirror charge lever 351 against the urging force of the mirror drive spring 343 to the position as shown in FIG. 2D. Under this condition, when the mirror charge lever 351 stopping the mirror drive lever 341 in an engaged state moves to the right, the mirror drive lever 341 is rotated counterclockwise by the urging force of the mirror drive spring 343. Along with this rotation, the movable reflecting mirror 201 is rotated through the engaging pin 347 from the down position to the up position, thus bringing into the mirror-up state as shown in FIG. 2E.

On the other hand, when the mirror charge lever 351 is moved to the left from the mirror-up state shown in FIG. 2E against the urging force of the mirror drive spring 343 and reaches the position shown in FIG. 2D, the mirror charge is completed, bringing into the mirror-down state.

Figure 3:
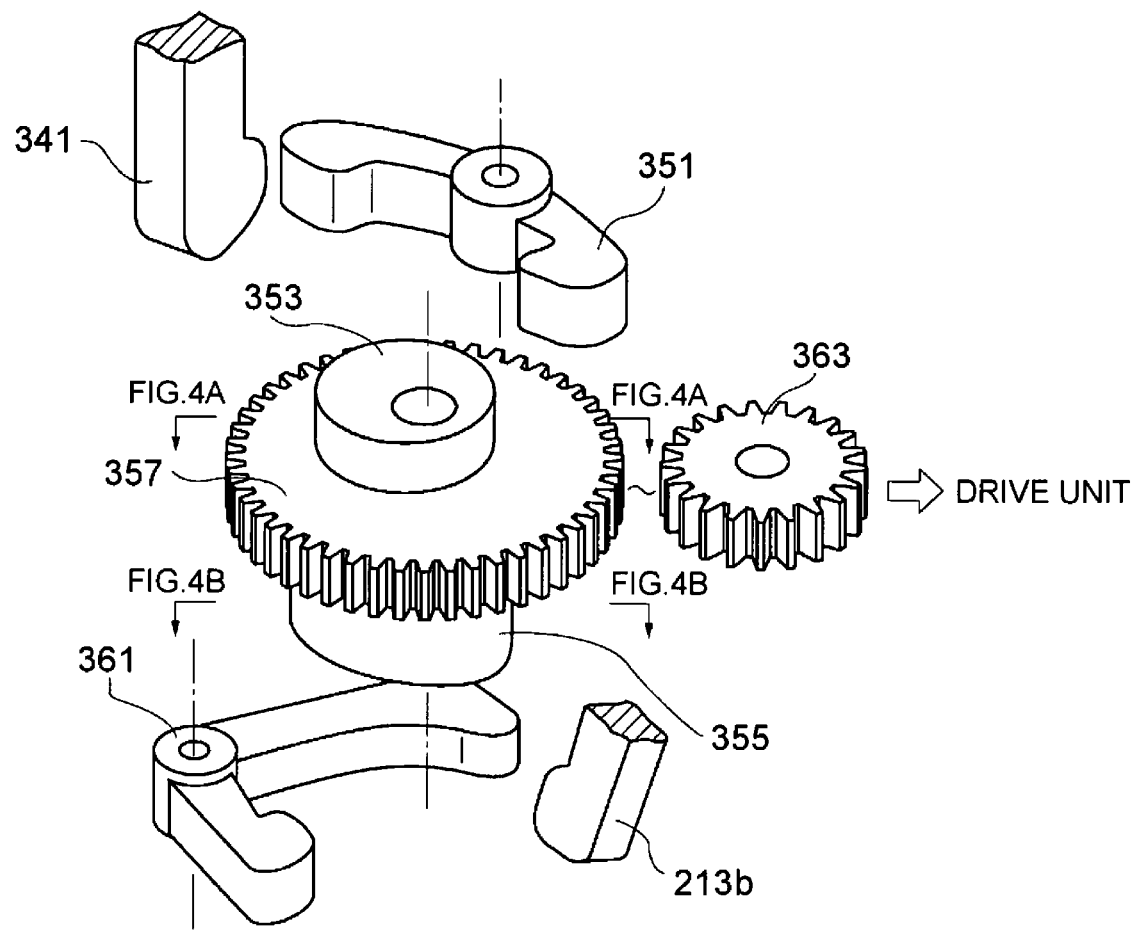
FIG. 3 is a partial detailed view of a shutter/mirror driving unit of the single-lens reflex digital camera according to the first embodiment of the present invention.

FIG. 3 is an exploded perspective view of the shutter/mirror driving unit 303 to which the driving force of the MS motor 301 is transmitted. The driving force of the MS motor 301 is transmitted to a cam gear 357 through a gear 363.

The parts depicted above the cam gear 357 are parts related to the driving of the mirror 201. A mirror charge cam 353 having a circumferential face that varies in distance radially from the axis of rotation is fixed on the top face of the cam gear 357, and one end of a mirror charge lever 351 is arranged to come into contact with a cam surface 353a of this mirror charge cam 353. The other end of this mirror charge lever 351 is arranged to come into contact with the mirror drive lever 341. Since the mirror drive lever 341 is urged by the spring in a direction to rotate the mirror charge lever 351 clockwise (see FIG. 2), the one end of the mirror charge lever 351 comes into press contact with the mirror charge cam 353. Therefore, the mirror charge cam 353 integrated with the cam gear 357 is rotated along with the rotation of the cam gear 357 to rotate the mirror charge lever 351 that is in press contact with the cam surface of this mirror charge cam 353, thereby moving the mirror drive lever 341.

Further, the parts depicted below the cam gear 357 are parts related to shutter charge. A cam surface 355a of a shutter charge cam 355 having a circumferential face that varies in distance radially from the axis of rotation of the cam gear 357 is fixed on the bottom face of the cam gear 357, and one end of a shutter charge lever 361 is arranged to come into contact with this shutter charge cam 355. The other end of this shutter charge lever 361 is arranged to come into contact with the shutter set lever 213b. Therefore, the shutter charge cam 355 integrated with the cam gear 357 is rotated along with the rotation of the cam gear 357 to rotate the shutter charge lever 361 that is in contact with the cam surface of this shutter charge cam 355, thereby rotating the shutter set lever 213b.

Figure 4A:
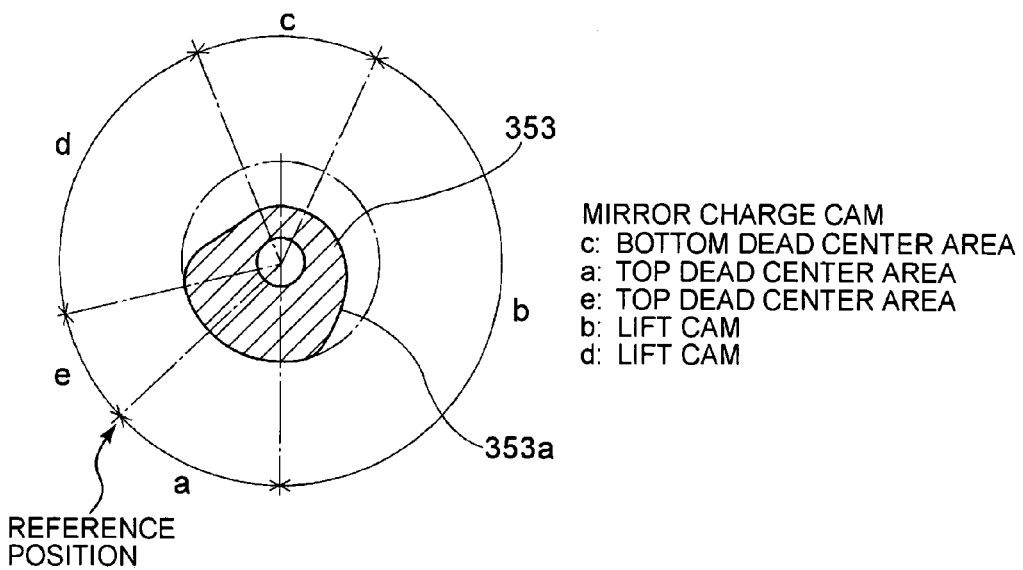
FIGS. 4A and 4B are views showing cam areas of the single-lens reflex digital camera according to the first embodiment of the present invention, where
Figure 4B:
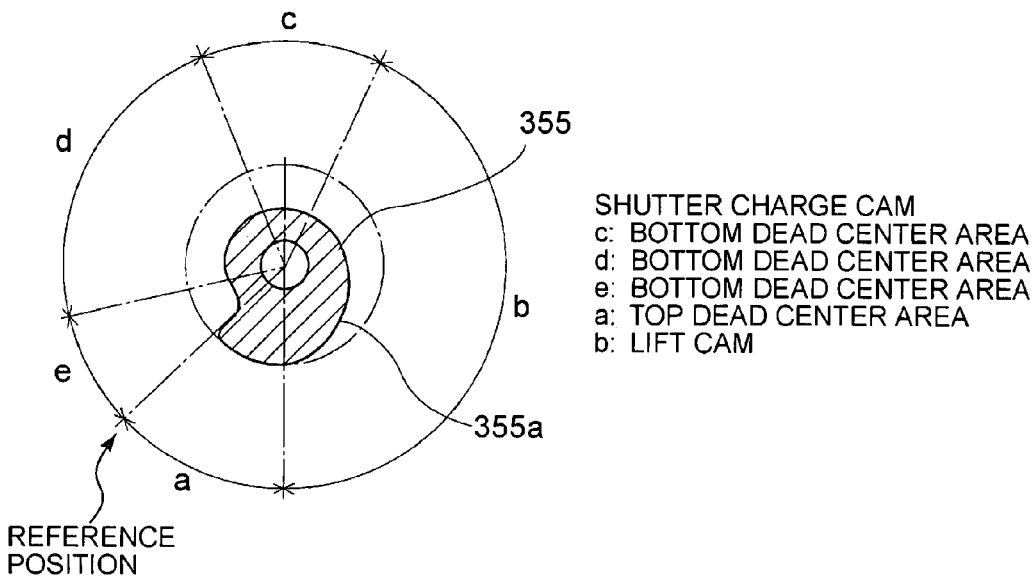

FIG. 4A shows the cam surface of the above-mentioned mirror charge cam 353 as viewed from a direction indicated by an arrow in FIG. 3, and FIG. 4B shows the cam surface of the shutter charge cam 355 as viewed from a direction indicated by another arrow in FIG. 3. As shown in FIG. 4A, the cam surface 353a of the mirror charge cam 353 is composed of five areas, namely a top dead center area a, a lift cam b, a bottom dead center area c, a lift cam d, and a top dead center area e. On the other hand, as shown in FIG. 4B, the cam surface 355a of the shutter charge cam 355 is composed of five areas, namely a top dead center area a, a lift cam b, a bottom dead center area c, a bottom dead center area d, and a bottom dead center area e. Further, though not shown, a plurality of photointerruptors are provided for detecting the rotation or movement of the mirror charge cam 353 and the shutter charge cam 355 or members driven together with these cams. These photointerruptors perform a-detection to output L level within the area a, c-detection to output L level within the area c, and e-detection to output L level within the area e (see FIG. 5).

In the area a, the mirror charge cam 353 is at the top dead center position, and the movable reflecting mirror 201 is in the down state (see FIG. 2D), i.e., it is at the viewing position (reflecting position) for reflecting the subject light beam into the finder optical system. In this mirror-down state, the subject light beam is guided to the finder optical system, enabling viewing of the subject image through the finder. The subject light beam is also guided to a photometric sensor 211 to be described later to enable light metering. Further, the subject light beam is guided to the distance measurement unit 218 by means of the sub-mirror 203 to enable distance measurement and driving of the photographing lens to an in-focus position (automatic focusing control). In addition, in the area a, the shutter charge cam 355 is also at the top dead center position, so that the shutter 213 is in the charged state as indicated P2 in FIG. 2B. Although the shutter 213 is in the charged state, since the shutter set lever 213b is not retracted, shutter curtains cannot travel in this state, thereby prohibiting exposure.

In the area c, the mirror charge cam 353 is at the bottom dead center position, and the movable reflecting mirror 201 is in the up state (see FIG. 2E), i.e., it is at the position retracted from the shooting optical path. The shutter charge cam 355 is also at the bottom dead center position, and the shutter set lever 213b is located at position P1 shown in FIG. 2B. In this state c, the movable reflecting mirror 201 becomes the up state. When the movable reflecting mirror 201 becomes the up state, there are two cases to consider: one is the case of normal shooting, and the other is the case of a live view mode. Note that viewing of the subject image through the finder is disabled in the area c. Further, the subject image is formed on a CCD 221 as the image pickup device, so that image information from this CCD 221 can be output. In the live view mode, the subject image can be displayed on an LCD monitor 26 based on the image information from the CCD 221, enabling viewing of the subject image. Further, when 2R is turned on with the full press of the release button 21, the shutter curtains can travel as long as the shutter charge is completed. In sync with the traveling of the shutter curtains of this shutter 213, the CCD 221 can capture and record a still image.

In the area e, the mirror charge cam 353 is at the top dead center position, and the movable reflecting mirror 201 is in the down state. On the other hand, the shutter charge cam 355 is at the bottom dead position, and the shutter set lever 213b is at the position indicated by P1 in FIG. 2B.

The area b is a transition area between the area c and the area a. In the area b, both the mirror charge lever 351 and the shutter charge lever 361 are rotated along with the rotation of the mirror charge cam 353 and the shutter charge cam 355. In other words, when the area c shifts to the area a, the movable reflecting mirror 201 changes from the up state to the down state, and the shutter set lever 213b moves from the position P1 to the position P2 in FIG. 2B.

On the other hand, the area d is a transition area between the area c and the area e. In the area d, the cam surface 353a shifts along with the rotation of the mirror charge cam 353, so that the mirror charge lever 351 is rotated to rotate the mirror drive lever 341. On the other hand, even when the shutter charge cam 355 is rotated, its cam surface 355a does not shift, and hence the shutter charge lever 361 does not rotate. In other words, when the cam surface shifts from the area c to the area a, the movable reflecting mirror 201 changes from the up state to the down state, but the shutter set lever 213b remains at the position P1 in FIG. 2B. Thus, the movement varies between the area b and the area d.

In the embodiment, when automatic focusing control is performed during live view display, the up and down operation of the movable reflecting mirror 201 is performed using this area d, but the charging operation of the shutter 213 is not performed. On the other hand, upon normal shooting operation, the up and down operation of the movable reflecting mirror 201 and the charging operation of the shutter 213 are both performed using the area b. The relative rotational positions between the mirror charge cam 353 and the shutter charge cam 355 are so illustrated in FIGS. 4A and 4B that the reference positions of both cams are the same as each other. However, both cams can be configured that the reference positions of both cams differ depending on the arrangement of the mirror charge lever 351 and the shutter charge lever 361.

Figure 6:
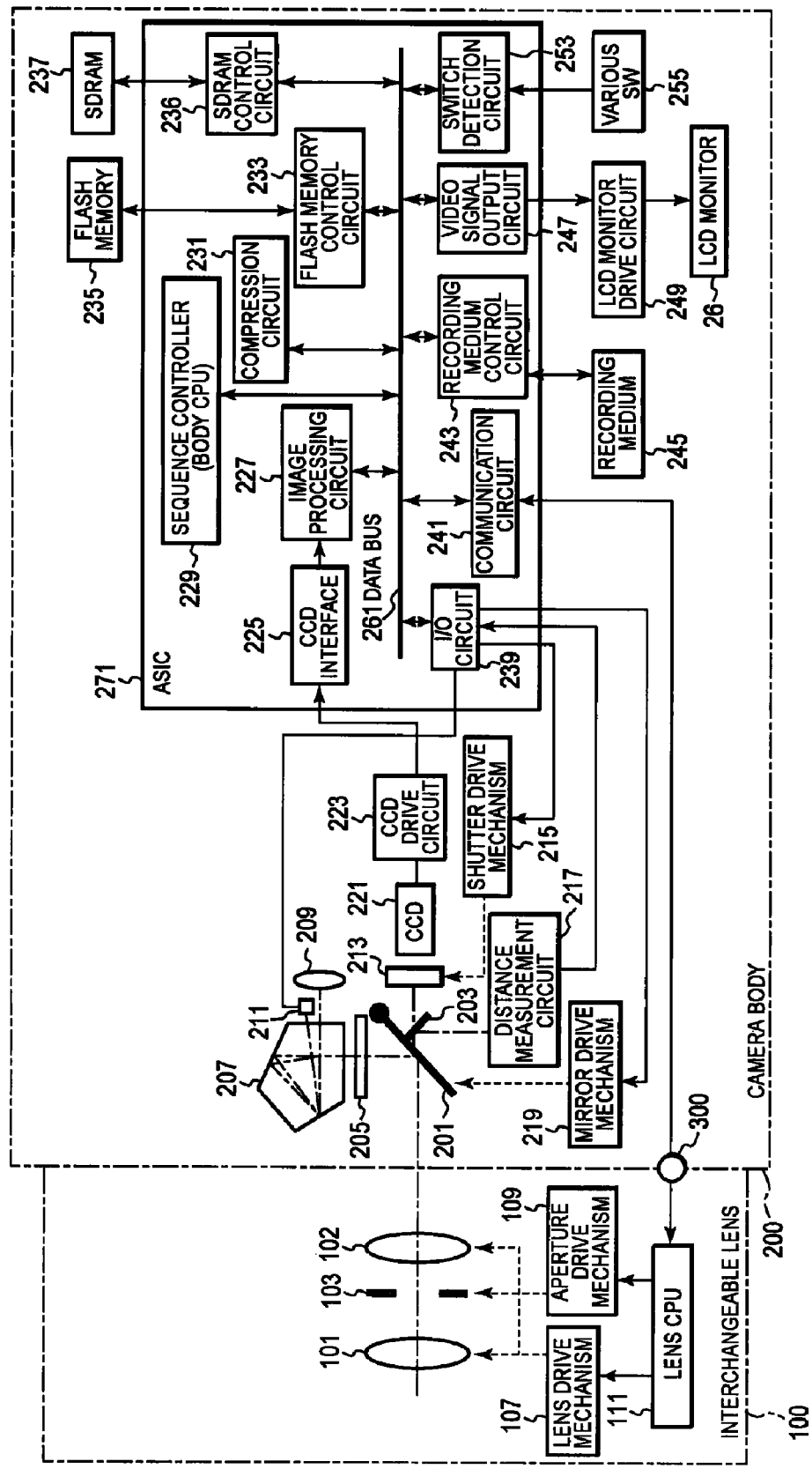
FIG. 6 is a block diagram showing the general structure, mainly of an electric system, of the single-lens reflex digital camera according to the first embodiment of the present invention.

Referring next to FIG. 6, the general structure of the single-lens reflex digital camera will be described, mainly about its electric system. As mentioned above, in the single-lens reflex digital camera according to the embodiment, the interchangeable lens 100 and the camera body 200 are constructed separately and electrically connected through a communication contact 300. Note here that the interchangeable lens 100 and the camera body 200 can be integrally constructed.

Inside the interchangeable lens 100, lenses 101 and 102 for focusing adjustment and focal length adjustment, and an aperture 103 for adjusting the amount of light passing therethrough are arranged. The lenses 101, 102 and the aperture 103 are so connected that the lenses 101, 102 will be driven by a lens drive mechanism 107 and the aperture 103 will be driven by an aperture drive mechanism 109. The lens drive mechanism 107 and the aperture drive mechanism 109 are connected to a lens CPU 111, respectively, and the lens CPU 111 is connected to the camera body 200 through the connection contact 300. The lens CPU 111 controls the components inside the interchangeable lens 100. In other words, the lens CPU 111 controls the lens drive mechanism 107 to perform focusing and zoom driving, while it controls the aperture drive mechanism 109 to control the aperture value.

Inside the camera body 200, the movable reflecting mirror 201, the sub-mirror 203, the focusing screen 205, and the pentaprism 207 are arranged in the manner mentioned above. The movable reflecting mirror 201 is driven by a mirror drive mechanism 219. An eyepiece lens 209 used for viewing the subject image is arranged on the exit side of the pentaprism 207. The photometric sensor 211 is arranged at the side of the eyepiece lens 209 and in a position not to interfere with viewing of the subject image. The focusing screen 205, the pentaprism 207, and the eyepiece lens 209 forms part of a finder optical system.

Further, as mentioned above, the sub-mirror 203 is provided on the backside of the movable mirror 201, and the distance measurement circuit 217 including the focusing sensor is arranged in the reflective direction of this sub-mirror 203. The shutter 213 is arranged behind the movable mirror 201, and the driving of this shutter 213 is controlled by the shutter drive mechanism 215. The CCD 221 as the image pickup device is arranged behind the shutter 213 to photo-electrically convert, into an electric signal, the subject image formed thereon through the lenses 101 and 102. The CCD 221 is connected to a CCD drive circuit 223 through which analog digital conversion (AD conversion) is performed. The CCD drive circuit 223 is connected to an image processing circuit 227 through a CCD interface 225. This image processing circuit 227 performs various image processing such as color correction, gamma (□) correction, contrast correction, etc. In addition, the image processing circuit 227 generates image data for live view display on the LCD monitor 26.

The image processing circuit 227 is connected to a data bus 261 inside an ASIC (Application Specific Integrated Circuit) 271. Connected to this data bus 261 other than the image processing circuit 227 are a body CPU 229, a compression circuit 231, a flash memory control circuit 233, an SDRAM control circuit 236, an I/O circuit 239, a communication circuit 241, a recording medium control circuit 243, a video signal output circuit 247, and a switch detection circuit 253.

The body CPU 229 connected to the data bus 261 controls the overall flow of this single-lens reflex digital camera. The compression circuit 231 connected to the data bus 261 is a circuit for compressing image data stored in an SDRAM 237 using JPEG or TIFF format. Note that the image compression format is not limited to JPEG or TIFF, and any other compression method can be employed. The flash memory control circuit 233 connected to the data bus 261 is connected to a flash memory 235. This flash memory 235 stores a program for controlling the overall flow of the single-lens reflex camera, and the body CPU 229 controls the single-lens reflex digital camera according to the program stored in this flash memory 235. The flash memory 235 is an electrically rewritable nonvolatile memory. The SDRAM 237 is connected to the data bus 261 through the SDRAM control circuit 236. This SDRAM 237 is a buffer memory for temporary storage of image data processed by the image processing circuit 227 or image data compressed by the compression circuit 231.

The I/O circuit 239 is connected with the above-mentioned photometric sensor 211, shutter drive mechanism 215, distance measurement circuit 217, and mirror drive mechanism 219, respectively, to control input and output of data to and from each circuit such as the body CPU 229 through the data bus 261. The communication circuit 241 connected to the lens CPU 111 through the communication contact 300 is connected to the data bus 261 to communicate with the body CPU 229 and the like for exchange of data and communication of control instructions. The recording medium control circuit 243 connected to the data bus 261 is connected to a recording medium 245 to control the recording of image data and the like onto the recording medium 245. The recording medium 245 is a rewritable recording medium such as an xD-Picture Card(™), a Compact Flash(™), an SD Memory Card(™), or a Memory Stick(™). The recording medium 245 is removably loaded into the camera body 200. Alternatively, a hard disk can be connected through the communication contact.

The video signal output circuit 247 connected to the data bus 261 is connected to the LCD monitor 26 through an LCD monitor drive circuit 249. The video signal output circuit 247 is a circuit for converting image data, stored in the SDRAM 237 or the recording medium 245, into a video signal for display on the LCD monitor 26. The LCD monitor 26 is arranged on the back of the camera body 200, but the location thereof is not limited to the backside. The LCD monitor 26 can be arranged on any side as long as the camera user can view it, and be of any type other than the LCD type. Various switches 255 include switches for detecting first and second strokes of the shutter release button, switch for instructing a playback mode, a switch for instructing the movement of a cursor on the screen of the LCD monitor 26, a switch for instructing a shooting mode, an OK switch for confirming each of selected modes, etc. The various switches 255 are connected to the data bus 261 through the switch detection circuit 253.

Figure 7:
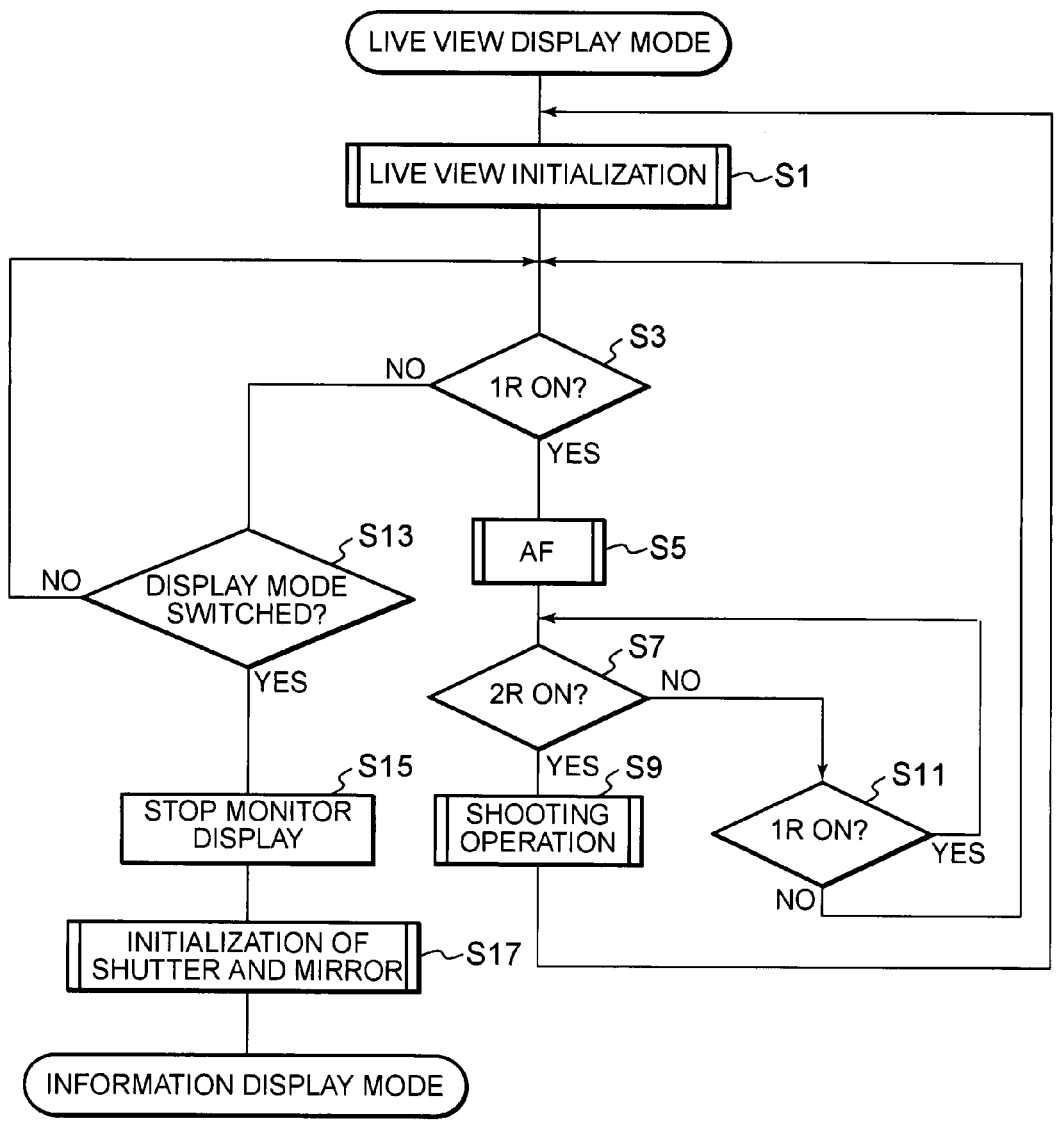
FIG. 7 is a flowchart of a live view display mode of the single-lens reflex digital camera according to the first embodiment of the present invention.

Referring next to FIG. 7, a flow of live view display will be described. When the camera enters a live view display mode with a press of an operation button (not shown) provided on the camera body 200, live-view initialization is first executed (S1). In this initialization, power is supplied to the CCD 221, and live-view display conditions are set to keep a proper brightness of live view display on the LCD monitor 26. In addition, the mirror-up operation of the movable reflecting mirror 201 and opening of the shutter 213 are also performed. The latter will be described later with reference to FIG. 8. During this live-view initialization, a live view display is started. It is next determined whether the release button 21 is pressed halfway, that is, whether 1R is on (S3). As a result of determination, if it is on, the procedure goes to step S5 to execute an automatic focusing control (AF) subroutine. In this subroutine, automatic focusing control and light metering operations are performed while displaying a live view of a subject image on the LCD monitor 26. The details will be described later with reference to FIG. 9.

After completion of automatic focusing control (AF) in step S5, it is then determined whether the release button 21 is fully pressed, that is, whether 2R is on (S7). As a result of determination, if 2R is on, the procedure goes to step S9 to perform a shooting operation. This shooting operation subroutine will be described later with reference to FIG. 10. After completion of the shooting operation, the procedure returns to the live-view initialization in step S1 to repeat the above-mentioned steps.

If 2R is off in step S7, the procedure goes to step S11 to determine whether 1R is on or not. If it is determined that the release button 21 has been pressed halfway but not fully pressed yet, the camera enters a waiting state in which the determinations in step S7 and step S11 are repeated. Then, when the camera user has removed his or her finger from the release button 21, the procedure returns to step S3 to repeat the above-mentioned steps.

If 1R is off in step S3, the procedure goes to step S13 to determine whether the display mode is switched with a press of an operation button, not shown, i.e., from the live view display of the subject image to an optical display through the finder optical system. If the display mode is not switched, the procedure returns to step S3. On the other hand, if the display mode is switched, processing such as to power off the CCD 221 in order to stop the live view display of the subject image on the LCD monitor 26 is performed in step S15. During the period from when the live view display is started in the live view initialization in step S1 until the live view display is stopped in step S15, the live view is displayed continuously on the LCD monitor 26 based on captured image data repeatedly acquired by the CCD 221. Then, in step S17, the shutter 213 and the movable reflecting mirror 201 are initialized. This is processing for returning to an information display mode to display shooting information on the LCD monitor 26 while enabling viewing of a subject image through the optical finder. In this processing, the movable reflecting mirror 201 that have been moved to the up position (reflecting position) is moved to the down position. During this initialization, the MS motor 301 continues to be driven until the above-mentioned mirror charge cam 353 and shutter charge lever 361 move from the area c and reach the area a.

Figure 8:
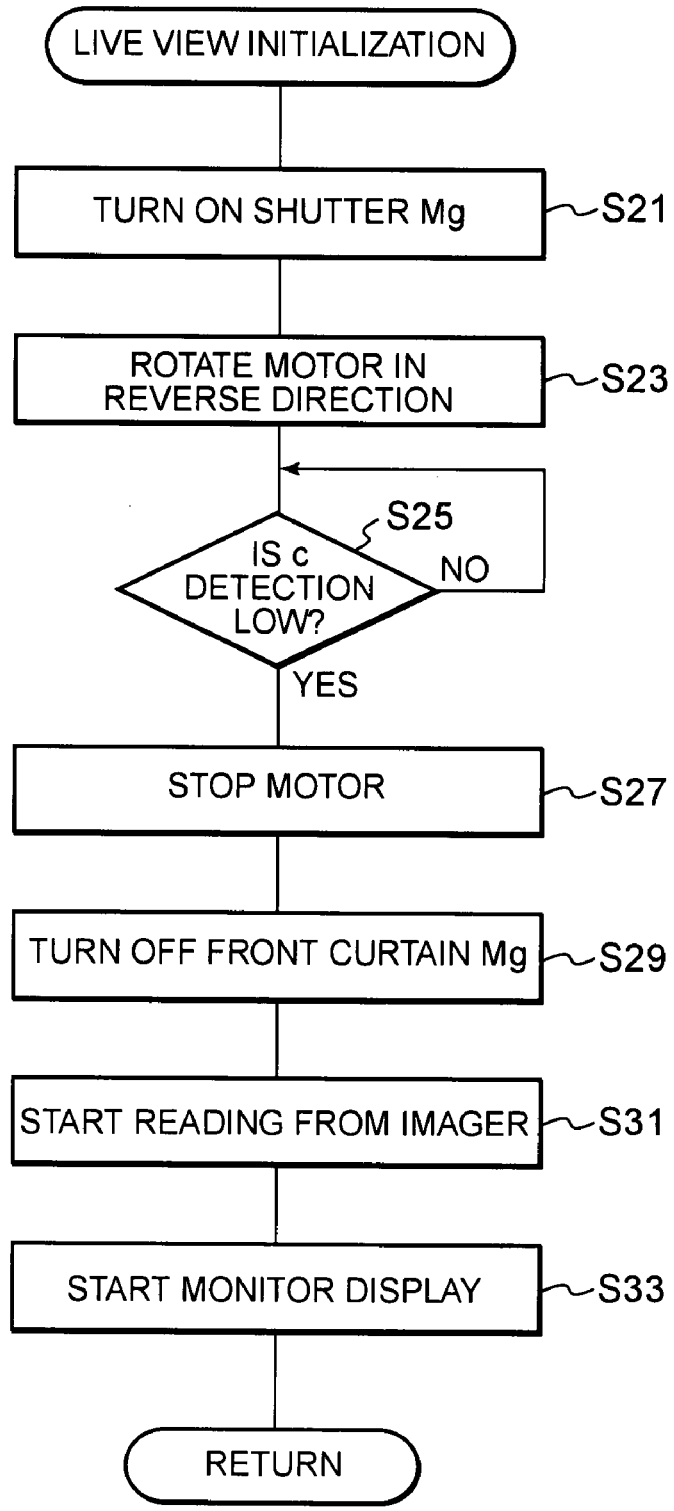
FIG. 8 is a flowchart of live-view initialization of the single-lens reflex digital camera according to the first embodiment of the present invention.

Referring next to a flowchart of FIG. 8 and a timing chart of FIG. 11, the live-view initialization in the above-mentioned step S1 will be described in detail. The mirror charge cam 353 and the shutter charge cam 355 are located in the area a before the start of a live view. Upon live-view initialization, the MS motor 301 drives the cam gear 357 to the area c in which a live view display is provided. First, shutter magnets Mg for holding the shutter curtains are powered to hold front and rear curtains, respectively (S21). After that, the MS motor 301 is reversed in rotation direction (t1 in FIG. 11) to drive the mirror charge cam 353 and the shutter charge cam 355 from the area a to the area c via the area b (S23). In the meantime, the mirror drive lever 341 moves from the position in FIG. 2D toward the position in FIG. 2E, so that movable reflecting mirror 201 is rotated by the spring force of the mirror drive spring 343 toward the up (retracted) position.

Further, the shutter set lever 213b moves from the position P2 toward the position P1 in FIG. 2B. Then, when the mirror charge cam 353 and the shutter charge cam 355 reach the area c (S25, t2 in FIG. 11), the rotation of the MS motor 301 is stopped (S27). Thus, the movable reflecting mirror 201 is moved to the up (retracted) position and the shutter set lever 213b is moved to the retracted position (P1).

Then, the power supply to the magnet Mg for holding the shutter front curtain of the shutter 213 is turned off to let the shutter front curtain travel (S29). After completion of traveling of the shutter front curtain (t3 in FIG. 11), the shutter 213 becomes a fully open state and hence the subject image is formed on the CCD 221, starting reading of image information from the CCD 221 as the imager (S31). Then, based on the read image information, the live view display is provided on the LCD monitor 26 (S33). In order to provide the live view display, the image information is repeatedly read from the CCD 221 (e.g., 30 frames per second), thus displaying a live view as a moving image.

Figure 9:
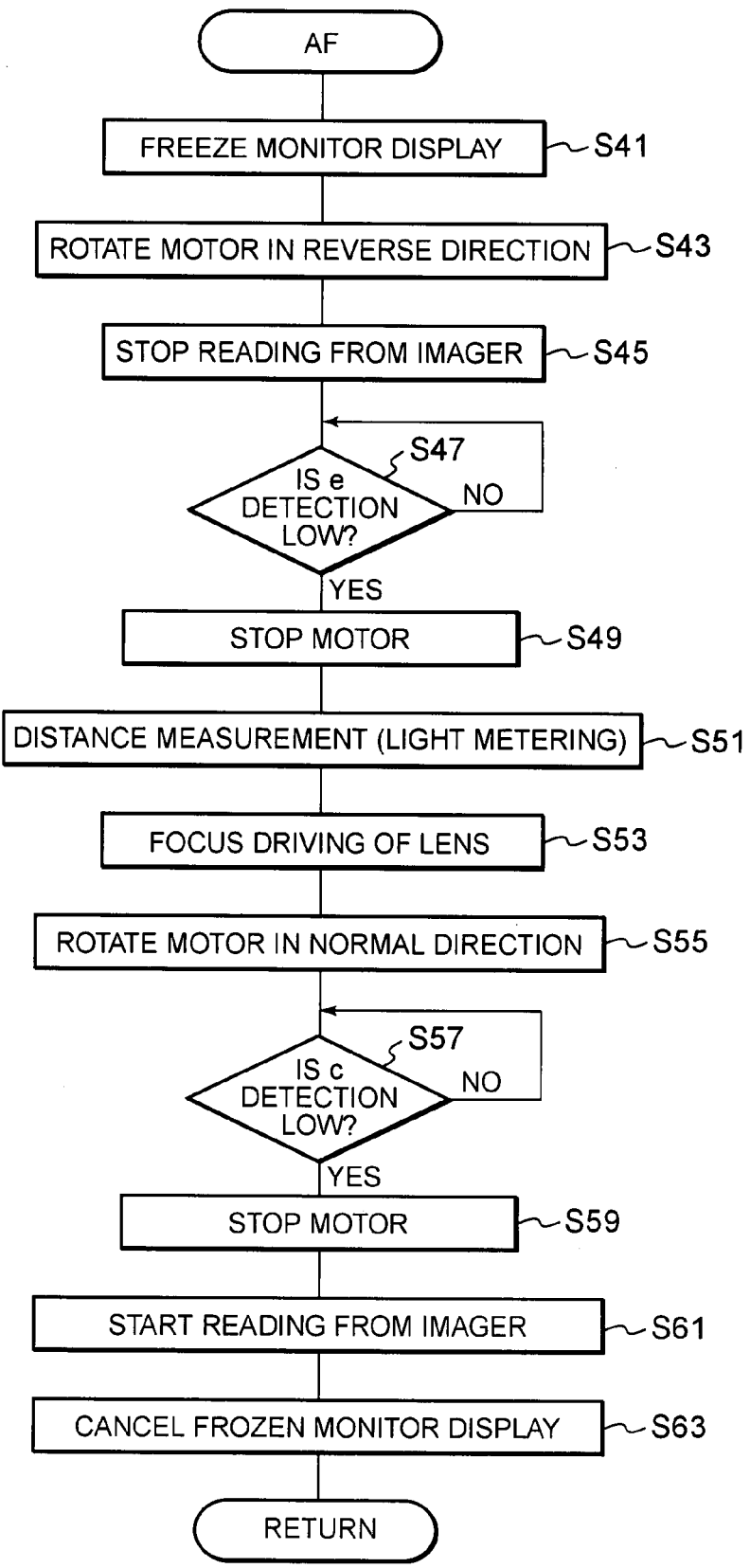
FIG. 9 is a flowchart of an automatic focusing control operation of the single-lens reflex digital camera according to the first embodiment of the present invention.

Referring next to a flowchart of FIG. 9 and the timing chart of FIG. 11, the automatic focusing control (AF) operation in step S5 will be described in detail. As mentioned above, this subroutine is to turn the movable reflecting mirror 201 down in response to the half press of the release button 21 in order to perform distance measurement and light metering. First, the live view being displayed on the LCD monitor 26 is frozen (S41). This is a measure to deal with an interruption of the live view caused by disabling acquisition of the image information because the movable reflecting mirror 201 turns down and hence no subject image is formed on the CCD 221. Then, the reverse rotation of the MS motor 301 is started (S43, t11 in FIG. 11), and reading from the CCD 221 is stopped (S45).

By the reverse rotation of the MS motor 301, the mirror charge cam 353 and the shutter charge cam 355 are driven from the area c to the area e via the area d. In the meantime, the mirror drive lever 341 moves from the position in FIG. 2E toward the position in FIG. 2D while charging the mirror drive spring 343, and the movable reflecting mirror 201 is moved down to the down position (reflecting position) by the spring force of the mirror-down spring 345. Further, as mentioned above, the shutter set lever 213b remains at the position P1 in FIG. 2B, leaving the shutter charge uncompleted. Then, when the mirror charge cam 353 and the shutter charge cam 355 reach the area e (S47, t12 in FIG. 11), the rotation of the MS motor 301 is stopped (S49). This causes the movable reflecting mirror 201 to move to the down state, but the shutter set lever 213b remains at the retracted position (P1) (where the shutter charge is uncompleted).

The distance measurement unit 218 receives light of a subject image through the movable reflecting mirror 201 and the sub-mirror 201 to perform the distance measurement operation (S51). Based on the distance measurement operation, a defocus amount of the photographing lens 101 is detected, so that the body CPU 229 calculates the amount of driving to an in-focus position to perform automatic focusing control through the lens CPU 111 and the lens drive mechanism 107 (S53). Further, part of the subject light beam guided from the movable reflecting mirror 201 is measured by the photometric sensor 211 to perform light metering (S51), and the body CPU 229 calculates exposure values such as shutter speed, aperture value, etc. based on this light metering value.

Figure 11:
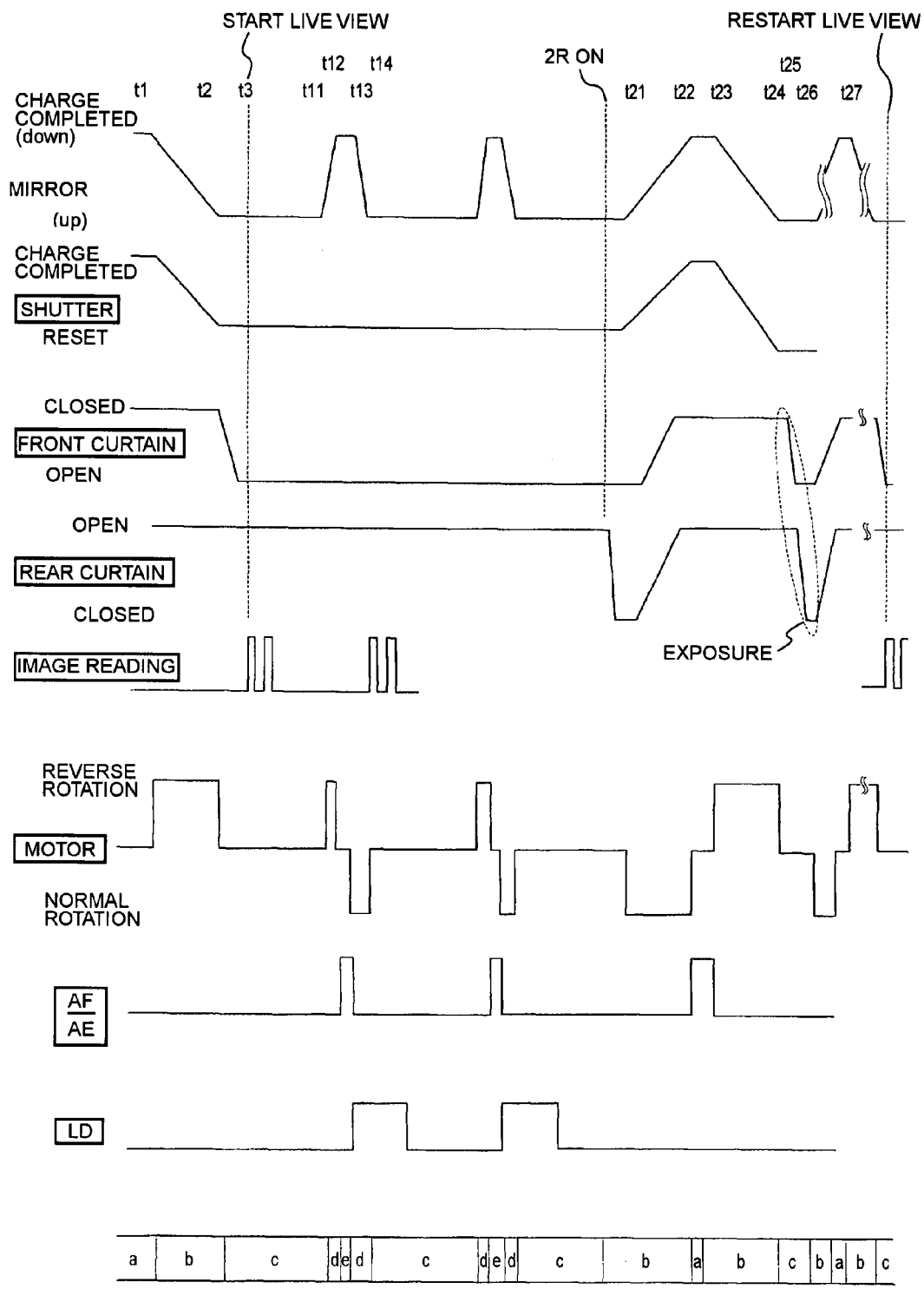
FIG. 11 is a timing chart in the live view display mode of the single-lens reflex digital camera according to the first embodiment of the present invention.

Next, the MS motor 301 is driven to rotate in normal direction (S55, t13 in FIG. 11). This is to return the mirror charge cam 353 and the shutter charge cam 355 from the area e to the area c via the area d, contrary to the above. In the meantime, the movable reflecting mirror 201 returns from the down position to the up position. On the other hand, the shutter set lever 213b remains at the retracted position (P1), leaving the shutter charge uncompleted. Then, when the mirror charge cam 353 and the shutter charge cam 355 reach the area c (S57, t14 in FIG. 11), the rotation of the MS motor 301 is stopped (S59). After that, reading of the image information from the CCD 221, which was stopped at step S45, is restarted (S61, t14 in FIG. 11) to restart the live view display on the LCD monitor 26 (S63), i.e., to cancel the frozen state of the LCD monitor 26.

Note that the distance measurement operation must be completed while the movable reflecting mirror 201 is at the reflecting position, but the lens driving operation can be performed when the movable reflecting mirror 201 is in the process of being retracted. Therefore, the lens driving (LD) is continued after completion of the retraction of the movable reflecting mirror 201. After the restart of the live view, the camera user can view how the subject is focused through the live view display on the LCD monitor 26.

Figure 10:
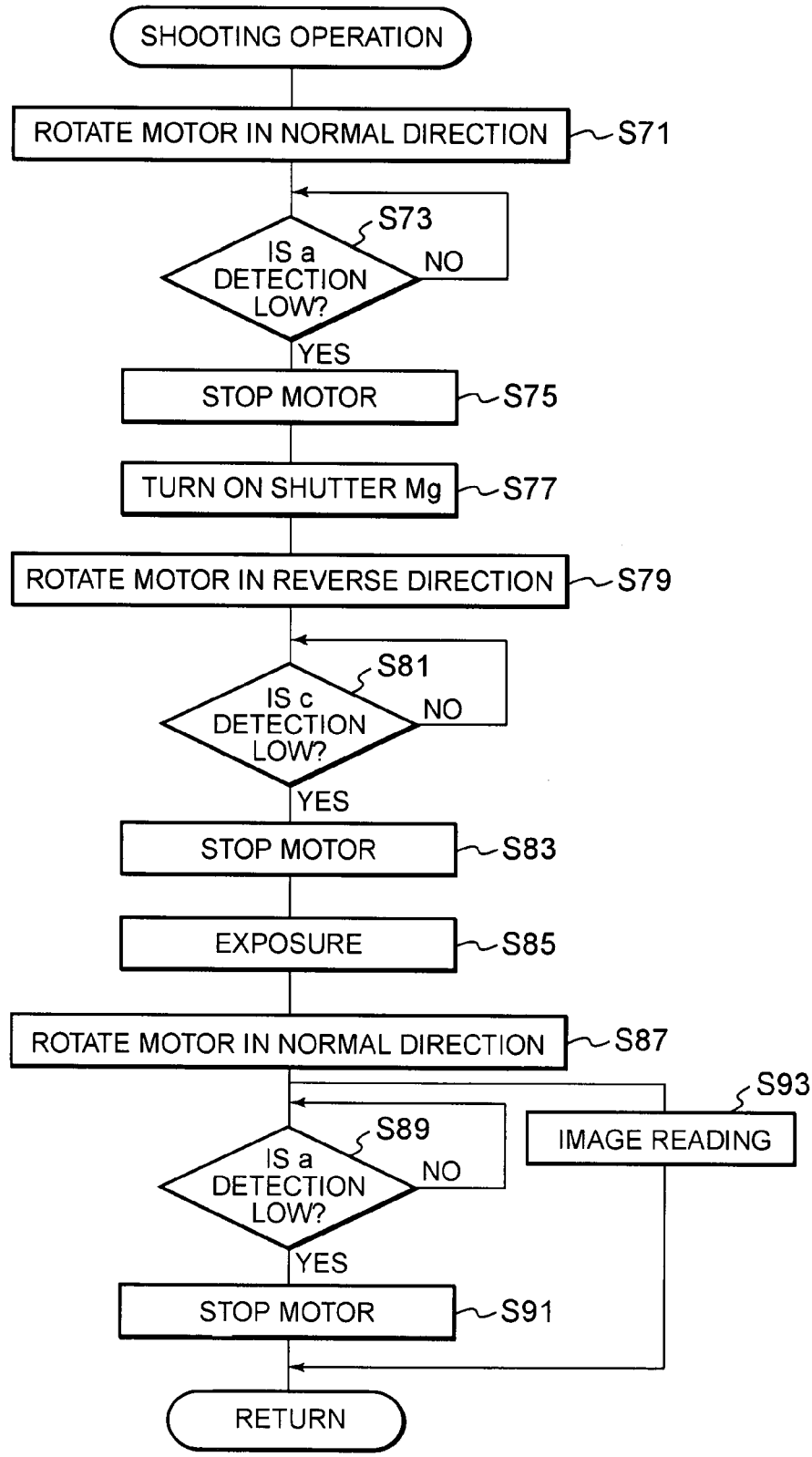
FIG. 10 is a flowchart of a shooting operation of the single-lens reflex digital camera according to the first embodiment of the present invention.

Referring next to a flowchart of FIG. 10 and the timing chart of FIG. 11, the shooting operation in step S9 will be described in detail. As mentioned above, this subroutine is to acquire a still image based on the output of the CCD 221 in response to the full press of the release button 21 during the live view display and record the acquired still image on the recording medium 245. The live view is provided when the mirror charge cam 353 and the shutter charge cam 355 are in the area c. When an imaging operation is instructed, the mirror charge cam 353 and the shutter charge cam 355 are once driven to the area a. Then, after completion of the shutter charge, they are driven to the area c to acquire image information on the still image.

First, the MS motor 301 is driven to rotate in normal direction (S71, t21 in FIG. 11) to drive the mirror charge cam 353 and the shutter charge cam 355 from the area c to the area a via the area b. As a result, the movable reflecting mirror 201 becomes the down state along with the driving of the mirror drive lever 341, and the shutter set lever 213b moves to a shutter-charge complete position (P2 in FIG. 2B) to charge the shutter.

When it is detected that the mirror charge cam 353 and the shutter charge cam 355 reach the area a (S73, t22 in FIG. 11), the rotation of the MS motor 301 is stopped (S75). Then, the magnets Mg for holding the shutter front curtain and the rear curtain are powered to hold the shutter front curtain and the rear curtain, respectively (S77). After that, the reverse driving of the MS motor 301 is started (S79, t23 in FIG. 11). This reverse driving causes the mirror charge cam 353 and the shutter charge cam 355 to return from the area a to the area c via the area b again. In this process, the movable reflecting mirror 201 moves from the down (reflecting) position to the up (retracted) position, and the shutter set lever 213b moves to the retracted position (P1).

When the mirror charge cam 353 and the shutter charge cam 355 reach the area c (S81, t24 in FIG. 11), the reverse driving of the MS motor 301 is stopped (S83). Under this condition, since the movable reflecting mirror 201 is retracted from the shooting optical path, and the shutter 213 is in such a state to enable an exposure, the procedure moves to the exposure operation (S85). First, the energization of the magnet Mg holding the shutter front curtain is stopped to start the traveling of the shutter front curtain (t25 in FIG. 11). Then, after the lapse of a time period corresponding to the pre-calculated shutter speed, the traveling of the shutter rear curtain is started (t26 in FIG. 11). When the time required to travel the rear curtain has been elapsed after starting the traveling of the shutter rear curtain, the MS motor 301 is driven to rotate in normal direction (S87) to move the mirror charge cam 353 and the shutter charge cam 355 from the area c to the area a via the area b. In the meantime, the movable reflecting mirror 201 is driven to the down position, and the shutter charge of the shutter 213 is performed. Then, when it is determined that they are in the area a (S89), the driving of the MS motor 301 in normal direction is stopped (S91). Further, the image information on the still image is read from the CCD 221 during the driving of the MS motor 301 in normal direction (S93), providing a display of the read still image on the LCD monitor 26 for a predetermined period of time. After the MS motor 301 is stopped (S91), the live-view initialization in step S1 is performed. In other words, the mirror charge cam 353 and the shutter charge cam 355 are returned from the area a to the area c to restart the live view.

As described above, in the live view mode according to the first embodiment of the present invention, when the automatic focusing control operation is performed in response to the half press of the release button 21 (S5), the movable reflecting mirror 201 is inserted into the shooting optical path, moving it to the viewing position. This brings the distance measurement unit 218 into an operable state, enabling the automatic focusing control operation. Further, the photometric sensor 211 also becomes an operable state concurrently, enabling the light metering operation. Upon performing these operations, the movable reflecting mirror 201 is driven, but the shutter 213 is not driven at all. Thus, in the live view mode, since unnecessary shutter charge is eliminated, the load on the drive source can be reduced, reducing the time lag and energy loss.

As is apparent from FIG. 5, the gradients of both cams are gentle in the area b in which charging the shutter 213 and driving of the movable reflecting mirror 201 are performed at the same time. This makes it possible to reduce the energy loss though it takes time for driving. On the other hand, the gradients of both cams can be made steep in the area d in which only the driving of the movable reflecting mirror 201 is performed in the live view mode. This makes it possible to reduce the time lag without taking time for driving.

A second embodiment of the present invention will next be described with reference to FIG. 12. In the first embodiment, so-called single AF to perform automatic focusing control once with the half press of the release button 21 is performed. On the other hand, the second embodiment shows another example in which continuous AF for continuous automatic focusing control is performed in addition to single AF. This second embodiment is the same as the first embodiment except that the flow of the live view display mode is partially different from that of the first embodiment shown in FIG. 7. The following mainly describes the different points.

Figure 12:
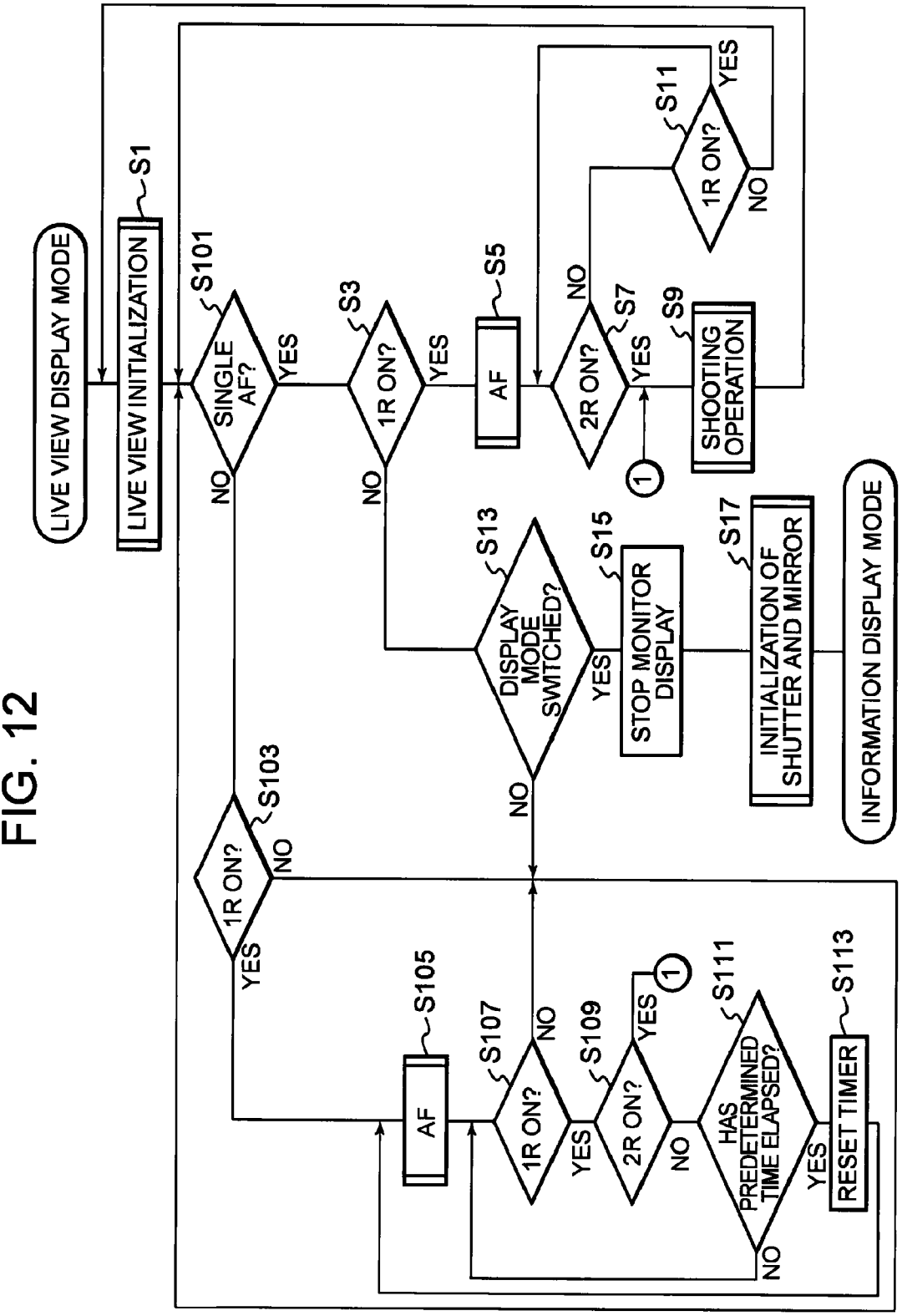
FIG. 12 is a flowchart of a live view display mode of a single-lens reflex digital camera according to a second embodiment of the present invention.

In the live view display mode shown in FIG. 12, the same steps as those in the flow of FIG. 7 are given the same step numbers to omit repetitive description. Upon completion of the live-view initialization in step S1, the AF mode set with an AF mode setting member, not shown, is determined. In the embodiment, only two modes, namely the single AF mode and the continuous AF mode can be set as the AF mode. In step S101, when single AF is determined, the procedure goes to step S3 to execute a process in the single AF mode. Since this single AF mode is the same as that in the first embodiment, the description thereof will be omitted.

In step S101, if the AF mode is not the single AF mode, that is, when the continuous AF mode is determined, the procedure goes to step S103 to determine whether the release button 21 is pressed halfway, that is, whether 1R is on. If 1R is off, the procedure returns to step S101 to wait until the release button 21 is pressed halfway. On the other hand, if 1R is on, the procedure goes to step S105 to execute the automatic focusing control (AF) subroutine described above with reference to FIG. 9. In other words, the movable reflecting mirror 201 is rotated from the retracted position to the viewing position, and under this condition, the photographing lens 101 is driven to the in-focus position based on the output of the distance measurement circuit 217. After completion of the AF operation, it is next determined in step S107 whether 1R is on or not. If the camera user has removed his or her finger from the release button 21, the procedure returns to step S101 to repeat the above-mentioned steps. On the other hand, the release button 21 remains pressed halfway, it is determined in step S109 whether the release button 21 is fully pressed, that is, whether 2R is on. If 2R is on, the procedure goes to step S9 to perform the shooting operation in the same manner as in the first embodiment. On the other hand, if 2R is off, the procedure goes to step S111 to determine whether a timer has measured the lapse of a predetermined time. If the predetermined period of time has not elapsed, the procedure returns to step S107 to determine the state of 1R. On the other hand, if the predetermined period of time has elapsed in step S111, the timer is reset (S113) to start the timer, and the procedure returns to step S105 to execute the automatic focusing control (AF) subroutine described above with reference to FIG. 9. The continuous AF mode is a mode for repeating single AF at predetermined time intervals, and each predetermined time interval is measured by the timer in steps S111 and S113.

If the AF mode is changed from the continuous AF mode to the single AF mode during the live view mode, the procedure shifts from step S101 to step S3, while if the AF mode is changed from the single AF mode to the continuous AF mode, the procedure shifts from step S101 to step S103. In either step, the AF mode is changed, respectively.

As described above, in the second embodiment, if the single AF mode is set during the live view display mode, the movable reflecting mirror 201 is moved from the retracted position to the reflecting position in response to the half press of the release button 21, enabling automatic focus control. On the other hand, if the continuous AF mode is set, the movable reflecting mirror 201 is moved to the reflecting position at predetermined time intervals to perform automatic focusing control repeatedly while the release button 21 remains pressed halfway.

In the first and second embodiments of the present invention, when automatic focusing control is performed during the live view display mode, the movable reflecting mirror 201 is moved to the viewing position to bring the distance measurement circuit 217 into an operable state. Thus, the automatic focusing control can be performed even in the live view mode, and this is very convenient. Further, in the first and second embodiments, the driving of the movable reflecting mirror 201 during the live view mode can be performed independently from the shutter charge operation. This makes it possible to reduce the load and the time lag.

Further, the normal and reverse driving of the mirror charge cam 353 and the shutter charge cam 355 is successfully used to perform both the mirror charge and the shutter charge upon normal shooting or only the mirror charge in the live view mode. Thus, the structure can be made simple and compact.

In the first and second embodiments of the present invention, two cams, namely the mirror charge cam 351 and the shutter charge cam 355, are employed, but the present invention is not limited to this structure. For example, only a single cam can be so employed that the cam areas are divided into those for mirror charge use and those for shutter charge use. Further, the normal and reverse driving of the cams is used to shift to the live view display and to change the AF mode during the live view mode, but a planetary gear or the like can also be used to make the shift and change. In either case, it can be configured such that both the driving of the movable reflecting mirror 201 and the shutter charge are performed upon shifting to the live view display, and upon performing the AF operation during the live view mode, only the drive mechanism of the movable reflecting mirror 201 is actuated without performing the shutter charge.

Further, in the first and second embodiments, the single CCD 221 is used as the image pickup device, but the present invention is also applicable to a camera for providing a live view display by switching between outputs from a plurality of image pickup devices.

Further, in the first and second embodiments, the movable reflecting mirror 201 switches between the optical path to the finder optical system and the optical path to the image pickup device, but the present invention is not limited to this structure. For example, the present invention is also applicable to such a structure to switch between an image pickup device for image recording and an image pickup device for image viewing. Further, in the embodiments, the mirror charge is performed upon mirror-up of the movable reflecting mirror 201, but it can be performed upon mirror-down as well.

Further, in the first and second embodiments, the movable reflecting mirror 201 turns into the down state upon AF to perform the distance measurement operation, but the present invention is not limited thereto, and both the distance measurement operation and the focusing operation of the photographing lens can be performed in the mirror-down state.

As described above, in the first and second embodiments, a structure can be considered which comprises: the movable reflecting mirror 201 made movable by the rotation of the MS motor 301 between a viewing position (down position) for reflecting a light beam from the photographing lens 101 to guide the light beam to the finder optical system, and a retracted position (up position) retracted from an area through which the light beam from the photographing lens 101 passes; a focusing sensor (provided inside the distance measurement circuit 217) for focusing the photographing lens 101 on a subject; a reflecting mirror for focusing (sub-mirror 203) to guide the light beam from the photographing lens 101 to the focusing sensor (provided inside the distance measurement circuit 217) in conjunction with the movable reflecting mirror 201 when the movable reflecting mirror 201 is at the viewing position (down position); an automatic focusing control part (e.g., body CPU 229, lens CPU 111, lens drive mechanism 107) for driving the photographing lens 101 to an in-focus position based on the output of the focusing sensor; the image pickup device (CCD 221) arranged behind the movable reflecting mirror 201 to receive a subject light beam from the photographing lens 101 in order to capture a subject image; the shutter 213 arranged between the movable reflecting mirror 201 and the image pickup device (CCD 221); and a drive mechanism which, upon focusing the photographing lens 101 while displaying a moving image acquired from the image pickup device (CCD 221) on an image display part (e.g., LCD monitor 26), actuates the automatic focusing control part, drives the movable reflecting mirror 201 to the retracted position (up position), and drives the movable reflecting mirror 201 to the viewing position (down position) without charging the shutter 213. This structure makes it unnecessary to drive large loads for both the shutter charge and the driving of the movable reflecting mirror upon performing the distance measurement operation during the live view display, so that there can be provided a camera capable of displaying a live view with reduced time lag and energy loss.

Further, in the first and second embodiments, another structure can be considered which comprises: the MS motor 301 capable of rotating in both normal and reverse directions; the finder optical system for viewing an image formed through the photographing lens 101; the movable reflecting mirror 201 made movable by the rotation of the MS motor 301 between a viewing position (down position) for reflecting a light beam from the photographing lens 101 to guide the light beam to the finder optical system, and a retracted position (up position) retracted from an area through which the light beam from the photographing lens 101 passes; a focusing sensor (provided inside the distance measurement circuit 217) for focusing the photographing lens 101 on a subject; a reflecting mirror for focusing (sub-mirror 203) to guide the light beam from the photographing lens 101 to the focusing sensor (provided inside the distance measurement circuit 217) in conjunction with the movable reflecting mirror 201 when the movable reflecting mirror 201 is at the viewing position (down position); the image pickup device (CCD 221) arranged behind the movable reflecting mirror 201 to receive a subject light beam from the photographing lens 101 in order to capture a subject image when the movable reflecting mirror 201 is at the retracted position (up position); the image display part (e.g., LCD monitor 26) for displaying the subject image captured by the image pickup device (CCD 221) as a moving image; a focusing start part (e.g., 1R of the release button 21) for starting focusing of the photographing lens 101 on the subject; the shutter 213 arranged between the movable reflecting mirror 201 and the image pickup device (CCD 221) to be charged by the rotation of the MS motor 301; a mirror drive cam (mirror charge cam 353) having a first cam portion (area a) for locating the movable reflecting mirror 201 at the viewing position (down position), a second cam portion (area c) for locating the movable reflecting mirror 201 at the retracted position (up position) continuously from this first cam portion, and a third cam portion (area e) for driving the movable reflecting mirror 201 to the viewing position (down position) continuously from this second cam portion; the shutter charge cam 355 having a shutter charge cam portion (area b) for charging the shutter 213 in synchronism with the first cam portion (area a) and a non-charging cam portion (area d) for not charging the shutter 213 in synchronism with the second cam portion and the third cam portion; and a control part for performing control in such a manner that (1) when a still image is captured by the image pickup device (CCD 221), the control part rotates the MS motor 301 in both the normal and reverse directions to reciprocate the mirror drive cam (mirror charge cam 353) between the first cam portion and the second cam portion so as to move the movable reflecting mirror 201 between the viewing position (down position) and the retracted position (up position), and in synchronism with this, the control part reciprocates the shutter charge cam 355 between the shutter charge cam portion and the non-charging cam portion to repeat charging the shutter, and (2) upon focusing the photographing lens 101 while displaying a moving image acquired from the image pickup device (CCD 221) on the image display part (e.g., LCD monitor 26), the control part rotates the MS motor 301 in both the normal and reverse directions in response to the output of the focusing starting part (e.g., 1R of the release button 21) to reciprocate the mirror drive cam (mirror charge cam 353) between the second cam portion and the third cam portion so as to move the movable reflecting mirror 201 between the viewing position (down position) and the retracted position (up position), and in synchronism with this, the control part reciprocates the shutter charge cam 355 in the non-charging cam portion without charging the shutter 213. This structure makes it unnecessary to drive large loads for both the shutter charge and the driving of the movable reflecting mirror upon performing the distance measurement operation during the live view display. Therefore, the time lag and energy loss can be reduced, and especially use of the cam portions makes the camera compact and inexpensive.

Further, in the first and second embodiments, still another structure can be considered which comprises: a movable reflecting mirror 201 movable between a first position (down position) on the shooting optical path of the photographing lens 101 and a second position (up position) retracted from this shooting optical path; the image pickup device (CCD 221) arranged on the shooting optical path of the photographing lens 101 to receive a subject image formed through the photographing lens 101 and output a photoelectrically converted signal; the shutter 213 arranged between the image pickup device (CCD 221) and the movable reflecting mirror 201 to control the exposure time of the subject image on the image pickup device (CCD 221); the display device (LCD monitor 26) for providing a live view display of the subject image based on the photoelectrically converted signal; and a drive control part (body CPU 229) which, upon providing the live view display, drives the movable reflecting mirror 201 to the second position (up position) while driving the shutter 213 to the fully open state (S1), and upon performing a distance measurement operation during the live view display (S5), which moves the movable reflecting mirror 201 from the second position to the first position (S43) without performing the charging operation of the shutter 213. This structure makes is possible to reduce not only the load but also the time lag and the energy loss because only the driving of the movable reflecting mirror is performed during the distance measurement operation.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera capable of displaying a live view, the camera comprising:
   a movable reflecting mirror made movable by the rotation of a motor between a viewing position for reflecting a light beam from a photographing lens to guide the light beam to a finder optical system, and a position retracted from an area through which the light beam from the photographing lens passes;
   an image pickup device arranged behind the movable reflecting mirror to receive a subject light beam from the photographing lens in order to capture a subject image when the movable reflecting mirror is at the retracted position;
   an image display part for displaying the subject image captured by the image pickup device;
   a focusing sensor for focusing the photographing lens on a subject;
   a reflecting mirror for focusing to guide the light beam from the photographing lens to the focusing sensor in conjunction with the movable reflecting mirror when the movable reflecting mirror is at the viewing position;
   an automatic focus control mechanism for driving the photographing lens to an in-focus position based on the output of the focusing sensor;
   a shutter arranged between the movable reflecting mirror and the image pickup device; and
   a drive mechanism which, upon focusing the photographing lens while displaying a moving image acquired from the image pickup device on the image display part, actuates the automatic focusing control mechanism, drives the movable reflecting mirror to the retracted position, and drives the movable reflecting mirror to the viewing position without charging the shutter,
   wherein the drive mechanism includes a mirror drive cam and a shutter charge cam, and the mirror drive cam and the shutter charge cam are cam members rotating integrally with each other.

2. The camera according to claim 1, further comprising a focusing start part for starting focusing of the photographing lens on the subject,
   wherein the drive mechanism drives the movable reflecting mirror to the viewing position without charging the shutter in response to an instruction to start focusing from the focusing start part.

3. The camera according to claim 1, wherein the drive mechanism drives the movable reflecting mirror to the viewing position every predetermined time interval without charging the shutter.

4. A camera capable of displaying a live view, the camera comprising:
   a motor capable of rotating in both normal and reverse directions;
   a finder optical system for viewing an image formed through a photographing lens;
   a movable reflecting mirror made movable by the rotation of the motor between a viewing position for reflecting a light beam from a photographing lens to guide the light beam to the finder optical system, and a position retracted from an area through which the light beam from the photographing lens passes;
   a focusing sensor for focusing the photographing lens on a subject;
   a reflecting mirror for focusing to guide the light beam from the photographing lens to the focusing sensor in conjunction with the movable reflecting mirror when the movable reflecting mirror is at the viewing position;
   an image pickup device arranged behind the movable reflecting mirror to receive a subject light beam from the photographing lens in order to capture a subject image when the movable reflecting mirror is at the retracted position;
   an image display part for displaying the subject image captured by the image pickup device;
   a focusing start part for starting focusing of the photographing lens on the subject;
   a shutter arranged between the movable reflecting mirror and the image pickup device to be charged by the rotation of the motor;
   a mirror drive cam having a first cam portion for locating the movable reflecting mirror at the viewing position, a second cam portion for locating the movable reflecting mirror at the retracted position continuously from the first cam portion, and a third cam portion for driving the movable reflecting mirror to the viewing position continuously from the second cam portion;
   a shutter charge cam having a shutter charge cam portion for charging the shutter in synchronism with the first cam portion and a non-charging cam portion for not charging the shutter in synchronism with the second cam portion and the third cam portion; and
   a control part for performing control in such a manner that, upon capturing a still image by the image pickup device, the motor is rotated in both the normal and reverse directions to reciprocate the mirror drive cam between the first cam portion and the second cam portion so as to move the movable reflecting mirror between the viewing position and the retracted position, and in synchronism with this, the shutter charge cam is reciprocated between the shutter charge cam portion and the non-charging cam portion to charge the shutter, and upon focusing the photographing lens while displaying a moving image acquired from the image pickup device on the image display part, the motor is rotated in both the normal and reverse directions in response to the output of the focusing start part to reciprocate the mirror drive cam between the second cam portion and the third cam portion so as to move the movable reflecting mirror between the viewing position and the retracted position, and in synchronism with this, the shutter charge cam is reciprocated in the non-charging cam portion without charging the shutter.

5. The camera according to claim 4, wherein the mirror drive cam and the shutter charge cam are cam members rotating integrally with each other.

6. A camera capable of providing a live view display of images repeatedly acquired by an image pickup device on a display device as a moving image, the camera comprising:
   a reflecting-mirror drive mechanism for driving a movable reflecting mirror arranged on a shooting optical path;
   a shutter charge mechanism for charging a shutter to control an exposure time to the image pickup device;
   a single drive source;
   a driving-force transmission switching mechanism for changing the destination of transmitting a driving force of the drive source between both of the reflecting-mirror drive mechanism and the shutter charge mechanism and only the reflecting-mirror drive mechanism; and a drive control mechanism which, upon switching to the live view display, controls the driving-force transmission switching mechanism to transmit the driving force to both the reflecting-mirror drive mechanism and the shutter charge mechanism, and upon automatic focusing control during the live view display, which controls the driving-force transmission switching mechanism to transmit the driving force to only the reflecting-mirror drive mechanism.

7. A camera capable of displaying a live view, the camera comprising:
   a motor capable of rotating in both normal and reverse directions;
   a movable reflecting mirror driven between a reflecting position for entering a light beam from a photographing lens to reflect the light beam, and a position retracted from an area through which the light beam from the photographing lens passes;
   a shutter arranged behind the movable reflecting mirror;
   a cam member having a first drive portion for performing both of charging the shutter and driving of the movable reflecting mirror according to the normal and reverse rotations of the motor, and a second drive portion for performing only the driving of the movable reflecting mirror according to the normal and reverse rotations of the motor; and
   a control part for controlling the driving of the cam member by rotating the motor to select either the first drive portion or the second drive portion of the cam member.

8. The camera according to claim 7, wherein the mirror drive cam and the shutter charge cam are cam member rotating integrally with each other.

9. A camera capable of displaying a live view, the camera comprising:
   a motor capable of rotating in both normal and reverse directions;
   a movable reflecting mirror driven between a reflecting position for entering a light beam from a photographing lens to reflect the light beam, and a position retracted from an area through which the light beam from the photographing lens passes;
   an image pickup device arranged behind the movable reflecting mirror to receive a subject light beam from the photographing lens in order to capture a subject image when the movable reflecting mirror is at the retracted position;
   an image display part for displaying the subject image captured by the image pickup device;
   a shutter arranged between the movable reflecting mirror and the image pickup device, to be charged by the rotation of the motor;
   a mirror drive cam having a first cam portion for locating the movable reflecting mirror at the reflecting position, a second cam portion for locating the movable reflecting mirror at the retracted position continuously from the first cam portion, and a third cam portion for driving the movable reflecting mirror to the reflecting position continuously from the second cam portion;
   a shutter charge cam having a shutter charge cam portion for charging the shutter in synchronism with the first cam portion and a non-charging cam portion for not charging the shutter in synchronism with the second cam portion and the third cam portion; and
   a control part which, when a still image is captured by the image pickup device, rotates the motor in both the normal and reverse directions to reciprocate the mirror drive cam between the first cam portion and the second cam portion so as to move the movable reflecting mirror between the reflecting position and the retracted position, and in synchronism with this, which reciprocates the shutter charge cam between the shutter charge cam portion and the non-charging cam portion to repeat charging the shutter, and upon focusing the photographing lens while displaying a moving image acquired from the image pickup device on the image display part, which rotates the motor in both the normal and reverse directions to reciprocate the mirror drive cam between the second cam portion and the third cam portion so as to move the movable reflecting mirror between the reflecting position and the retracted position, and in synchronism with this, which reciprocates the shutter charge cam in the non-charging cam portion without charging the shutter.

10. The camera according to claim 9, wherein the mirror drive cam and the shutter charge cam are cam member rotating integrally with each other.

11. A method of selectively driving a main mirror and charging a shutter in a single-lens reflex camera by driving a single gear to which a first cam for main mirror driving and a second cam for shutter charge are coupled, wherein
   a cam surface of the first cam is divided by radial distance from an axis of rotation into a long radius area, a short radius area, and transition areas between the long radius area and the short radius area, and
   a cam surface of the second cam is divided by radial distance from an axis of rotation into a long radius area, a short radius area, and transition areas between the long radius area and the short radius area,
   the method comprising:
   driving the gear in a first range to drive the main mirror without charging the shutter, wherein the first range is a range within which a member for main mirror driving comes into contact with at least a transition area of the cam surface of the first cam and a member for shutter charge does not come into contact with at least a transition area of the cam surface of the second cam; and
   driving the gear in a second range to perform both the driving of the main mirror and the shutter charge, wherein the second range is a range within which the member for main mirror driving comes into contact with at least a transition area of the cam surface of the first cam and the member for shutter charge comes into contact with at least a transition area of the cam surface of the second cam.

* * * * *